(12) United States Patent
Krautter et al.

(10) Patent No.: US 11,932,215 B2
(45) Date of Patent: Mar. 19, 2024

(54) METHOD FOR OPERATING A BRAKING SYSTEM, AND BRAKING SYSTEM

(71) Applicant: Robert Bosch GmbH, Stuttgart (DE)

(72) Inventors: Andreas Krautter, Steinheim (DE); Bertram Foitzik, Ilsfeld (DE); Timo Haible, Backnang (DE)

(73) Assignee: ROBERT BOSCH GMBH, Stuttgart (DE)

( * ) Notice: Subject to any disclaimer, the term of this patent is extended or adjusted under 35 U.S.C. 154(b) by 562 days.

(21) Appl. No.: 17/261,415

(22) PCT Filed: May 25, 2019

(86) PCT No.: PCT/EP2019/063552
§ 371 (c)(1),
(2) Date: Jan. 19, 2021

(87) PCT Pub. No.: WO2020/020517
PCT Pub. Date: Jan. 30, 2020

(65) Prior Publication Data
US 2021/0300312 A1     Sep. 30, 2021

(30) Foreign Application Priority Data

Jul. 24, 2018  (DE) .................... 10 2018 212 290.3

(51) Int. Cl.
*B60T 13/74*   (2006.01)
*B60T 7/04*    (2006.01)
(Continued)

(52) U.S. Cl.
CPC ........... *B60T 13/745* (2013.01); *B60T 7/042* (2013.01); *B60T 7/06* (2013.01); *B60T 13/142* (2013.01);
(Continued)

(58) Field of Classification Search
None
See application file for complete search history.

(56) References Cited

U.S. PATENT DOCUMENTS

2009/0231761 A1* 9/2009 Abiko .................. G11B 5/4826
                                                        360/290
2012/0161507 A1   6/2012 Vollert et al.
(Continued)

FOREIGN PATENT DOCUMENTS

DE    102009000769 A1   8/2010
DE    102009054158 A1   5/2011
(Continued)

OTHER PUBLICATIONS

Machine translation—DE 102009054158 A1 (Year: 2011).*
International Search Report for PCT/EP2019/063552, dated Sep. 23, 2019.

*Primary Examiner* — Melanie Torres Williams
(74) *Attorney, Agent, or Firm* — NORTON ROSE FULBRIGHT US LLP

(57) ABSTRACT

A method for operating a braking system for a vehicle. A braking request signal characterizing a braking request is generated by actuation of a positioning assemblage of an actuation circuit, and a target brake pressure required in an active circuit is ascertained based on the braking request signal. An actual brake pressure in the active circuit is established in accordance with the target brake pressure, using a pressure generation device, by moving a displacer piston of the pressure generation device using an electric motor of the pressure generation device. If the braking request signal is constant over a predetermined time period, a wheel brake actuated by the active circuit is hydraulically decoupled from the pressure generation device by closing an (Continued)

isolation valve that is disposed in a hydraulic path between the pressure generation device and the wheel brake, and the electric motor is shut off.

9 Claims, 2 Drawing Sheets

(51) Int. Cl.
*B60T 7/06* (2006.01)
*B60T 13/14* (2006.01)
*B60T 13/68* (2006.01)

(52) U.S. Cl.
CPC .......... *B60T 13/148* (2013.01); *B60T 13/686* (2013.01); *B60T 2270/88* (2013.01)

(56) References Cited

U.S. PATENT DOCUMENTS

| | | | |
|---|---|---|---|
| 2013/0184953 A1* | 7/2013 | Morishita | B60T 7/122 |
| | | | 701/70 |
| 2014/0368027 A1 | 12/2014 | Bohm et al. | |
| 2016/0031423 A1* | 2/2016 | Ishida | B60T 8/4045 |
| | | | 303/11 |
| 2017/0174196 A1* | 6/2017 | Blattert | B60T 7/042 |

FOREIGN PATENT DOCUMENTS

| | | |
|---|---|---|
| DE | 102011079454 A1 | 1/2013 |
| DE | 102012025291 A1 | 6/2014 |
| DE | 102015220903 A1 | 5/2016 |
| DE | 102016224896 A1 | 6/2018 |
| KR | 20150138295 A | 12/2015 |
| WO | 2006111393 A1 | 10/2006 |
| WO | WO-2013094592 A1 * 6/2013 ............ B60T 13/166 |
| WO | WO-2014157582 A1 * 10/2014 ............ B60T 13/146 |
| WO | 2017220229 A1 | 12/2017 |
| WO | 2018091311 A1 | 5/2018 |
| WO | 2018130406 A1 | 7/2018 |

* cited by examiner

METHOD FOR OPERATING A BRAKING SYSTEM, AND BRAKING SYSTEM

BACKGROUND INFORMATION

Braking systems for vehicles, in particular for motor vehicles such as passenger cars or commercial vehicles, are usually implemented as electrohydraulic braking systems, in which a hydraulic pressure is generated in a braking circuit, by way of a brake master cylinder actuated by way of a manual actuation device, in order to actuate wheel brakes. Pressure generation in the braking circuit is usually assisted by a pressure generation device that has an electric motor and a displacer piston or plunger movable by way of the electric motor.

So-called "brake by wire" systems are also increasingly being used. One such system is described, for example, in German Patent Application No. DE 10 2011 079 454 A1. An actuation circuit in which a hydraulic pressure is generated by actuation of a brake master cylinder is provided in this braking system. That pressure is detected, and on the basis of the detected pressure a target brake pressure is ascertained which is established in an active circuit by way of a pressure generation device, which has an electric motor and a displacer piston movable by way of the electric motor, in order to actuate the wheel brakes.

SUMMARY

The present invention relates to a method for operating a braking system and to a braking system for a vehicle, in particular for a motor vehicle.

According to a first aspect of the present invention, a method for operating a braking system for a vehicle is provided.

In the method according to an example embodiment of the present invention, a braking request signal characterizing a braking request is generated by actuation of a positioning assemblage of an actuation circuit. A signal that represents a requested deceleration of the vehicle is consequently generated in this step.

In a further step, a target brake pressure required in an active circuit is ascertained on the basis of the braking request signal. The braking request signal thus constitutes an input variable for an ascertainment function that can be implemented, for instance, as a software module. This ascertainment function ascertains, as an output variable, a value for a brake pressure that is to be established in an active circuit.

In addition, an actual brake pressure is established in the active circuit in accordance with the target brake pressure by way of a pressure generation device, by moving a displacer piston of the pressure generation device with the aid of an electric motor of the pressure generation device. The electric motor can be coupled to the displacer piston in particular via a linkage that converts a rotary motion of the electric motor into a translational motion of the displacer piston, in order to vary the pressure in the active circuit and thereby actuate a wheel brake that acts on a wheel of the vehicle.

According to an example embodiment of the present invention, if the condition exists that the braking request signal is constant over a predetermined time period, a wheel brake actuated by the active circuit is hydraulically decoupled from the pressure generation device by closing an isolation valve that is disposed in a hydraulic path between the pressure generation device and the wheel brake, and the electric motor is shut off. The brake pressure that has been established is accordingly held in the active circuit after closure of the isolation valves between the wheel brake and the isolation valve, since the brake-side part of the hydraulic path located between the isolation valve and the wheel brake constitutes a closed volume. The wheel brake is therefore actuated with the established pressure, independently of the pressure generation device, as long as the isolation valve is closed. The electric motor is shut off after the isolation valves are closed, since it is no longer needed for pressure generation in the brake-side part of the hydraulic path.

According to a further aspect of the present invention, a braking system for a vehicle is provided.

The braking system according to an example embodiment of the present invention encompasses an actuation circuit having a positioning assemblage, actuatable by way of an actuation device, for generating a braking request signal, and an active circuit having a pressure generation device that has an electric motor and a displacer piston that is translationally movable by way of the electric motor; having at least one wheel brake hydraulically coupled to the pressure generation device; and having an isolation valve that is disposed in a hydraulic path between the pressure generation device and the wheel brake. The braking system furthermore has a control apparatus that is connected to the positioning assemblage of the actuation circuit, to the pressure generation device, and to the isolation valve.

According to an example embodiment of the present invention, the control apparatus is configured: to ascertain from the braking request signal a target brake pressure necessary in the active circuit; to apply control to the electric motor of the pressure generation device in order to establish an actual brake pressure in the active circuit in accordance with the target brake pressure; and, if the condition exists that the braking request signal is constant over a predetermined time period, to close the isolation valve for hydraulic decoupling of the wheel brake from the pressure generation device and to shut off the electric motor of the pressure generation device. The control apparatus is consequently configured to cause the braking system to execute the steps of the method according to the present invention.

In accordance with an example embodiment of the present invention, a desired brake pressure is built up in the active circuit by way of the pressure generation device; and, if a braking request determining the necessary actual brake pressure remains constant over a certain time period, a brake-side part of a hydraulic path between the pressure generation device and a wheel brake is decoupled from the pressure generation device by way of an isolation valve. This offers the advantage that the pressure in the brake-side part of the hydraulic path is kept constant (leaving aside leakage losses) independently of the pressure generation device. The pressure generation device can consequently be shut off. This reduces the risk that the electric motor of the pressure generation device might overheat if a high brake pressure is requested over a longer time period; this can be the case, for example, with the vehicle at a standstill. The service life of the electric motor is thereby increased, and its fail-safe characteristics are also improved.

According to an example embodiment of the method of the present invnetion, provision is made that the hydraulic decoupling of the wheel brake and the shutoff of the electric motor additionally require the existence of one or several of the following conditions:

a) a detected rotation speed of a wheel braked by the wheel brake is lower than a predetermined threshold rotation-speed value;

b) the ascertained target brake pressure of the active circuit is higher than a predetermined threshold pressure value;

c) a variable characterizing a thermal load on the electric motor of the pressure generation device reaches a predetermined threshold load value.

Condition a) can be satisfied, for example, if the detected rotation speed is so low that it can be assumed that the vehicle is at a standstill. The threshold rotation-speed value can be defined in particular by a number of revolutions per second of the respective wheel which corresponds to a traveling speed of the vehicle of 3 km/h. This condition prevents inadvertent, unintentional decoupling of the wheel brake from the pressure generation device while driving.

To ascertain whether condition c) is satisfied, for example, an electrical current intensity that is being supplied to the electric motor can be measured or detected. In this case condition c) is satisfied if the ascertained current intensity is above a limit current value for a predetermined time period. A temperature of the electric motor, e.g. a temperature in the motor housing, can also be detected directly. In this case condition c) is satisfied if a limit temperature value is reached. It is also possible to use a calculation model, for example in the form of a value table in which thermal load parameters are associated with specific torque profiles of the electric motor, to ascertain the thermal load. In this case condition c) is satisfied if the thermal load parameter of the value table exceeds a limit value.

Conditions b) and c) each reduce the number of situations in which the wheel brake becomes decoupled. Stress on the cutoff values is thereby advantageously reduced. Because decoupling is in some circumstances evident, e.g. acoustically evident, to the driver of the vehicle, driver comfort is thereby also enhanced.

According to a further embodiment of the method according to the present invention, the positioning assemblage has a brake master cylinder actuatable by way of an actuation device, and a sensor assemblage, generation of the braking request signal encompassing detection of a hydraulic pressure generated in the actuation circuit by actuation of the brake master cylinder, and/or of a positioning travel of the actuation device, as the variables characterizing the braking request. The braking request signal is consequently constituted by the detected hydraulic pressure in the actuation circuit and by the positioning travel of the actuation device, or assembled from those variables.

According to a further embodiment of the method of the present invention, after hydraulic decoupling of the wheel brake from the pressure generation device, the displacer piston is moved by way of the electric motor for pressure reduction between the pressure generation device and the isolation valve. After the isolation valve is closed and before the electric motor is shut off, the displacer piston is firstly actuated by the electric motor so that the target brake pressure is again established in a pressure-generator-side part of the hydraulic path, i.e. between the displacer piston and the isolation valve. According to this embodiment, before the electric motor is shut off the displacer piston is moved by said motor in such a way that the hydraulic pressure in the pressure-generator-side part of the hydraulic path is firstly reduced. An uncontrolled pressure reduction in the pressure-generator-side part of the hydraulic path, due to shutoff of the electric motor, is thereby avoided. Uncontrolled movement of the electric motor is also avoided. This further reduces the forces acting on the electric motor. A further result is to prevent the displacer piston from running in uncontrolled fashion against a rear stop, thereby decreasing mechanical loads and/or induction of voltage spikes.

According to a further embodiment of the method of the present invention, provision is made that if the condition exists that the braking request signal is constant over a predetermined time period, the pressure generation device is hydraulically coupled to the wheel brake at periodic time intervals, and the target brake pressure is established in the active circuit by way of the pressure generation device. This optional method step can also be referred to as "re-tensioning," and serves to compensate for pressure losses in the brake-side part of the hydraulic path which occur as a result of leakage or the like. For this, the pressure generation device is hydraulically coupled to the wheel brake at predetermined time intervals, for instance every 30 seconds to 45 seconds. Consequently, firstly the target brake pressure is established in the pressure-generator-side part of the hydraulic path by way of the pressure generation device. When the desired pressure is present in the pressure-generator-side part of the hydraulic path, the isolation valve is briefly opened in order to generate the desired pressure in the brake-side part of the hydraulic path. The isolation valve is then closed again, and the pressure generation device and thus the electric motor are shut off again. The operating reliability of the braking system is thereby further improved, since an unintended pressure loss in the brake-side part of the hydraulic path is compensated for.

According to a further embodiment of the method of the present invention, provision is made that if the condition that the braking request signal be constant over a predetermined time period is no longer satisfied, a hydraulic recoupling of the pressure generation device to the wheel brake is effected. Based on a time gradient of the braking request signal, a target brake pressure necessary in the active circuit after a predetermined compensation time period is ascertained by extrapolation of the braking request signal, and the actual brake pressure in the active circuit is established by way of the pressure generation device in such a way that the actual brake pressure in the active circuit reaches the target brake pressure upon expiration of the compensation time period. A controlled adjustment of the brake pressure to the target brake pressure thus occurs. Pressure jumps that occur because of the finite time required for opening of the isolation valve are thereby avoided. On the one hand, this reduces stress on the electric motor and on the valves, and operating comfort for the driver is thereby furthermore improved.

Hydraulic recoupling can also occur if one of the aforementioned conditions a) to c) is no longer satisfied, and/or if a fault in the braking system is detected, for example in the form of a leak or the like.

The compensation time period can be equal, in particular, to between 15 milliseconds and 500 milliseconds, and preferably between 20 and 200 milliseconds.

According to an embodiment of the braking system of the present invention, provision is made that the positioning assemblage has a brake master cylinder actuatable by way of the actuation device, and a sensor assemblage for detecting a hydraulic pressure generated in the actuation circuit by actuation of the brake master cylinder, and/or a positioning travel of the actuation device, as variables characterizing a braking request; the braking request signal being constituted by the variables that characterize the braking request and are detected by way of the sensor device.

The present invention will be explained in further detail below with reference to the exemplifying embodiments indicated in the schematic Figures.

BRIEF DESCRIPTION OF THE DRAWINGS

Unless otherwise indicated, elements, features and components that are identical, function identically, and operate identically are respectively labeled with the same reference characters in the Figures.

DETAILED DESCRIPTION OF EXAMPLE EMBODIMENTS

Figure 1:
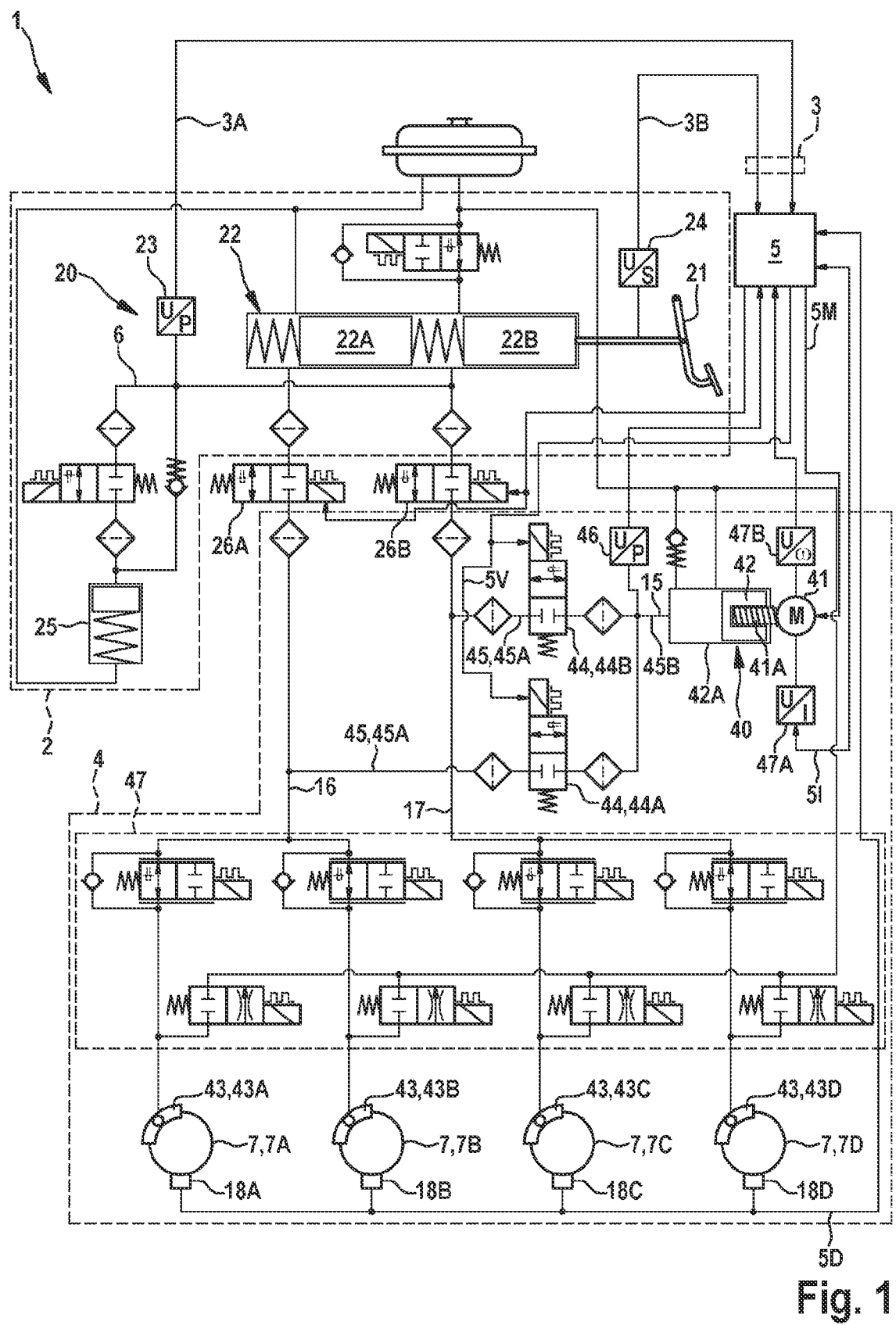
FIG. 1 schematically depicts a braking system according to an exemplifying embodiment of the present invention.

FIG. 1 shows, by way of example, a braking system 1 for a vehicle. As depicted in FIG. 1, braking system 1 has an actuation circuit 2, an active circuit 4, and a control apparatus 5.

Actuation circuit 2 depicted by way of example in FIG. 1 has a positioning assemblage 20 and an actuation device 21. Positioning device 20 can have in particular, as depicted by way of example in FIG. 1, a hydraulic brake master cylinder 22 as well as a sensor assemblage having at least one pressure sensor 23 and a positioning travel sensor 24. Positioning device 20 can furthermore have an optional return simulator 25. In positioning assemblage 20 shown by way of example in FIG. 1, brake master cylinder 22 is actuatable by way of actuation device 21, which is depicted in FIG. 1 by way of example as a foot pedal.

Actuation of brake master cylinder 22 here encompasses a shifting of one or several displacer pistons 22A, 22B, with the result that a hydraulic fluid, e.g. oil, becomes displaced against a return force, and a hydraulic force is thereby generated in actuation circuit 2.

The return force can be generated, for example, by the optional return simulator 25, which is coupled via a hydraulic line 6 hydraulically, i.e. in fluid-conveying fashion, to brake master cylinder 22.

The optional pressure sensor 23 detects the pressure generated by brake master cylinder 22, and generates a pressure signal 3A representing that pressure. In FIG. 1, pressure sensor 23 is coupled hydraulically, for example via return simulator 25, to hydraulic line 6. The optional positioning travel sensor 24 detects a positioning distance traveled by actuation device 21, and generates a positioning travel signal 3B representing the positioning travel. In the present case, pressure signal 3A and positioning travel signal 3B together constitute an exemplifying braking request signal 3 that is generated by way of positioning assemblage 20.

Alternatively, positioning assemblage 20 can also be constituted only by positioning travel sensor 24, which detects the positioning travel of actuation device 21. In this case, braking request signal 3 is constituted by positioning travel signal 3B.

Active circuit 4 has a pressure generation device 40, at least one wheel brake 43, and at least one isolation valve 44. Active circuit 4 furthermore optionally has a brake regulating valve assemblage 47. FIG. 1 depicts, by way of example, an active circuit 4 having a total of four wheel brakes 43A, 43B, 43C, 43D, and two isolation valves 44A, 44B.

Pressure generation device 40 has an electric motor 41 and a displacer piston 42 that is translationally movable by way of electric motor 41. A linkage 41A (depicted merely schematically in FIG. 1), which kinematically couples electric motor 41 to displacer piston 42, can be provided in order to convert a rotational motion of electric motor 41 into a translational motion of displacer piston 42. Displacer piston 42 is movable in a guidance cylinder 42A with the result that a hydraulic fluid, e.g. oil, present in guidance cylinder 42A becomes displaced.

Isolation valves 44A, 44B can be implemented, for example, as electromechanical switching valves. Isolation valves 44A, 44B are respectively switchable between an open state in which they enable a flow of fluid through them, and a closed state in which isolation valves 44A, 44B block a flow of fluid. In FIG. 1, isolation valves 44A, 44B are depicted by way of example in a closed state.

Wheel brakes 43A, 43B, 43C, 43D act respectively via friction linings (not depicted) on friction surfaces, for example in the form of a brake disc 7A, 7B, 7C, 7D, provided on a respective wheel, in order to brake the respective wheel.

The optional brake regulation valve assemblage 47 is depicted merely schematically in FIG. 1 and serves for individual regulation of the individual wheel brakes 43A, 43B, 43C, 43D. Brake regulation valve assemblage 47 is not explained in further detail herein in the interest of clarity.

Isolation valves 44A, 44B are hydraulically coupled to pressure generation device 40 via a branching hydraulic line 15. First isolation valve 44A is furthermore coupled via a branching hydraulic line 16 to brake discs 7A and 7B of the wheels (not depicted). Second isolation valve 44B is coupled via a branching hydraulic line 17 to brake discs 7C and 7D. Hydraulic lines 15, 16, 17 thus form a hydraulic path 45 between pressure generation device 40 and the at least one wheel brake 43. Hydraulic lines 16, 17 connected to wheel brakes 43 form a brake-side part 45A of hydraulic path 45. Hydraulic line 15 connected to pressure generation device 40 constitutes a pressure-generation-side part 45B of hydraulic path 45.

FIG. 1 further shows that an optional brake pressure sensor 46 for detecting a brake pressure can be provided in pressure-generation-side part 45B of hydraulic path 45. Also depicted in FIG. 1 by way of example are optional motor sensors 47A, 47B for detecting operating variables of the electric motor, such as the operating current or a rotational position.

As shown in FIG. 1, actuation circuit 2 can be hydraulically coupled via optional valves 26A, 26B to active circuit 4 in order to enable actuation of wheel brakes 43 via brake master cylinder 22 in the event of an operational failure of pressure generation device 40. Displacer pistons 22A, 22B are connected for that purpose via valves 26A, 26B to hydraulic lines 16, 17; valves 26A, 26B can be configured analogously to isolation valves 44A, 44B. Valves 26A, 26B are depicted in FIG. 1 in a closed state.

As further shown in FIG. 1, control apparatus 5 is connected to positioning assemblage 20 of actuation circuit 2, in particular to sensors 23, 24 of positioning assemblage 20; to pressure generation device 40; and to isolation valves 44. Control apparatus 5 can furthermore be connected to optional valves 26A, 26B, to the optional brake pressure sensor 46, and to the optional motor sensors 47A, 47B. "Connected" is to be understood here as a functional connection, in particular a data connection, which can be implemented in wire-based or wireless fashion.

Control apparatus 5 can have in particular a processor (not depicted) and a data memory (not depicted), the data memory containing software that is configured to cause the processor to execute the functions or the method described below.

Figure 2:
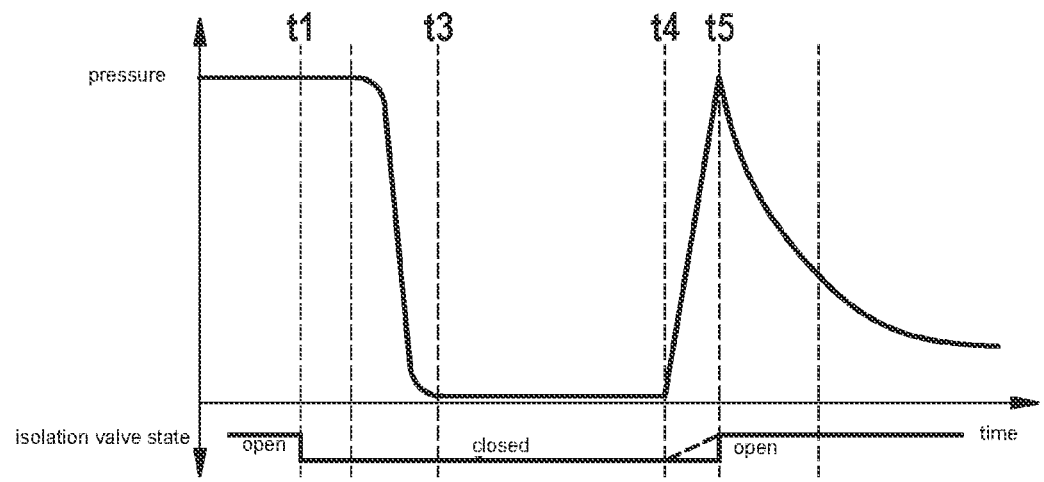
FIG. 2 shows a pressure profile in a pressure-generator-side part of a hydraulic path of the braking system depicted in FIG. 1, during execution of a method according to an exemplifying embodiment of the present invention.

The method according to the present invention will be explained below by way of example with reference to braking system 1 described above. FIG. 2 is a diagram in which the brake pressure in pressure-generator-side part 45B of active circuit 4 is plotted on a positive ordinate axis, and the switching state of isolation valves 44A, 44B is plotted on a negative ordinate axis. Time is plotted along the abscissa axis of the diagram depicted as FIG. 2.

Upon operation of braking system 1 in a vehicle, firstly a braking request signal 3 characterizing a braking request is generated by actuation of positioning assemblage 20. For example, actuation device 21 is moved, and brake master cylinder 22 is thereby actuated against the return force of the optional return simulator 25. Pressure sensor 23 and positioning travel sensor 24 respectively detect a pressure and a positioning travel. Pressure sensor 23 generates a corresponding pressure signal 3A, and positioning travel sensor 24 generates a corresponding positioning travel signal 3B. These constitute braking request signal 3, and are conveyed to control apparatus 5.

Control apparatus 5 ascertains on the basis of braking request signal 3 a target brake pressure necessary in active circuit 4, and generates a corresponding motor control signal 5M that is conveyed to electric motor 41 of pressure generation device 40.

Electric motor 41 is operated in accordance with motor control signal 5M while isolation valves 44A, 44B are open, and thereby moves displacer piston 42 in such a way that the target brake pressure becomes established in the active circuit. Optionally, it is possible by way of the optional brake pressure sensor 46 to implement a closed control loop in which the brake pressure in the active circuit is regulated in accordance with the target brake pressure.

If the condition exists that braking request signal 3 is constant over a predetermined time period, control apparatus 5 generates a valve control signal 5V that brings about a closure of isolation valves 44A, 44B. "Constant" can be understood here to mean in particular that a change in braking request signal 3 is less than a predetermined value. For example, braking request signal 3 is constant if neither pressure signal 3A nor positioning travel signal 3B changes within a predetermined time period, for example 3 seconds, by more than a predetermined value, for example more than 1 percent. A constant braking request signal 3 results in a constant brake pressure, as is evident from FIG. 2. Once the predetermined time t1 has elapsed, isolation valves 44A, 44B are closed.

A hydraulic decoupling of the at least one wheel brake 43 from pressure generation device 40 is thus accomplished by closure of the at least one isolation valve 44.

This hydraulic decoupling can additionally be linked to the existence of further conditions. For example, a rotation speed of the wheels can be detected at the wheels by way of rotation speed sensors 18A, 18B, 18C, 18D and can be conveyed as a rotation speed signal 5D to control apparatus 5. The hydraulic decoupling can be effected here under the additional condition that the detected rotation speed be lower than a predetermined threshold rotation-speed value. It can also be required, as an additional condition, that the ascertained target brake pressure of active circuit 4 be greater than a predetermined threshold pressure value. Alternatively or additionally, a further condition that can be required is that a variable characterizing a thermal load on electric motor 41 of the pressure generation device reach a predetermined threshold load value. For example, the operating current detected by way of motor sensor 47A can be conveyed as a current signal 5I to control apparatus 5. If the operating current 5I is above a limit value for a specific time period, a closure of isolation valves 44 occurs.

After the closure of isolation valves 44, a motor control signal 5M is generated and electric motor 41 is shut off. This occurs at the point in time labeled t3 in FIG. 2. As further shown in FIG. 2, after the closure of isolation valves 44 and before electric motor 41 is shut off, a controlled pressure reduction in pressure-generator-side part 45B of hydraulic path 45 can optionally be effected by the fact that electric motor 41 is actuated at time t2, by a motor control signal 5M generated by control apparatus 5, in such a way that displacer piston 42 increases the volume in guidance cylinder 42A.

Optionally, if the condition exists that braking request signal 3 is constant over a predetermined time period, pressure generation device 40 can be hydraulically coupled to wheel brake 43 at periodic time intervals, for example at a time interval of between 30 seconds and 45 seconds, and the target brake pressure can be established in active circuit 4 by way of pressure generation device 40. This is not depicted in FIG. 2. In this process, electric motor 41 is activated by a motor control signal 5M so that it activates displacer piston 42 and the brake pressure in pressure-generator-side part 45B of hydraulic path 45 becomes established in accordance with the target brake pressure. When the required target brake pressure is reached, isolation valves 44 are opened by way of a valve control signal 5V and shortly thereafter are closed again. Electric motor 41 is then shut off again.

If the condition that braking request signal 3 be constant over a predetermined time period is no longer satisfied, a hydraulic recoupling of pressure generation device 40 to wheel brake 43 occurs. Control apparatus 5 generates for that purpose a motor control signal 5M to activate electric motor 41 so as to establish the brake pressure in pressure-generator-side part 45B of hydraulic path 45 in accordance with the target brake pressure. A valve control signal 5V that causes isolation valves 44 to open is then generated. In FIG. 2, electric motor 41 is activated at time t4, and isolation valves 44 are opened at time t5. As shown by way of example in FIG. 2, a linear pressure rise in pressure-generator-side part 45B of hydraulic path 45 is generated by pressure generation device 40 between times t4 and t5. A non-linear pressure rise in pressure-generator-side part 45B of hydraulic path 45 can of course also be generated by pressure generation device 40.

Figure 3:
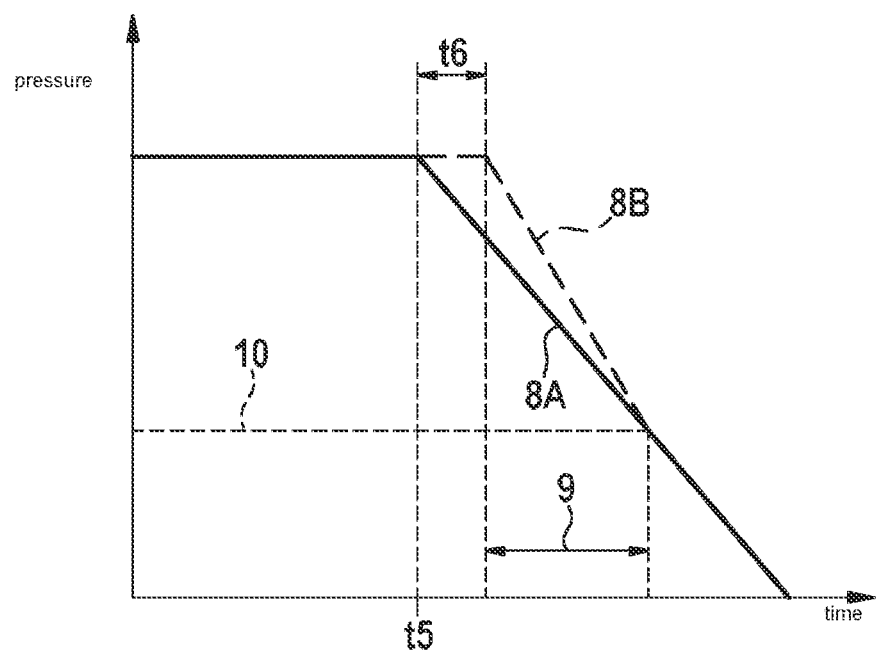
FIG. 3 shows a pressure profile in a brake-side part of the hydraulic path of the braking system depicted in FIG. 1, during execution of a method according to a further exemplifying embodiment of the present invention.

As shown by way of example in FIG. 3, an optional controlled adaptation of the brake pressure in active circuit 4 to the required target brake pressure can occur after isolation valves 44 are opened. It is thereby advantageously possible to avoid a pressure jump in active circuit 4 which can occur as a result of a change in the target brake pressure during the time t6 required for isolation valves 44 to open.

In FIG. 3, a target brake pressure ascertained on the basis of a braking request signal 3 is plotted against time, by way of example, as a solid line 8A. An exemplifying profile of the brake pressure generated by way of pressure generation apparatus 40 in active circuit 4 is furthermore plotted against time in FIG. 3 as a dashed line. In order to adapt the brake pressure in the active circuit, a time gradient of braking request signal 3 during the time t6 required for the opening of isolation valves 44 is ascertained. Based on this gradient, braking request signal 3 is extrapolated for a predetermined compensation time period 9, and from that extrapolated braking request signal 3 an extrapolated profile of the target brake pressure, or a target brake pressure 10 required in active circuit 4 after a predetermined compensation time period 9, is ascertained. After the opening of isolation valves 44, electric motor 41 is operated on the basis of a motor control signal 5M in such a way that the brake pressure generated by pressure generation device 40 reaches the required target brake pressure 10 as compensation time period 9 elapses. This can be accomplished, for example, via a linear decrease in the brake pressure in active circuit 4 during compensation time period 9, as shown by way of example in FIG. 3. Compensation time period 9 can be equal to, for example, between 15 milliseconds and 500 milliseconds, in particular between 20 milliseconds and 200 milliseconds.

What is claimed is:

1. A method for operating a braking system for a vehicle, comprising the following steps:
    generating, by actuation of a positioning assemblage of an actuation circuit, a braking request signal characterizing a braking request;
    ascertaining a target brake pressure required in an active circuit based on the braking request signal;
    establishing an actual brake pressure in the active circuit in accordance with the target brake pressure, using a pressure generation device, by moving a displacer piston of the pressure generation device using an electric motor of the pressure generation device; and
    when a condition exists that the braking request signal is constant over a predetermined time period, hydraulically decoupling a wheel brake, actuated by the active circuit, from the pressure generation device by closing an isolation valve that is disposed in a hydraulic path between the pressure generation device and the wheel brake, and shutting off the electric motor;
    wherein when the condition that the braking request signal is constant over the predetermined time period is no longer satisfied: a hydraulic recoupling of the pressure generation device to the wheel brake is effected, based on a time gradient of the braking request signal, a target brake pressure necessary in the active circuit after a predetermined compensation time period is ascertained by extrapolation of the braking request signal, and the actual brake pressure in the active circuit is established using the pressure generation device in such a way that the actual brake pressure in the active circuit reaches the target brake pressure upon expiration of the compensation time period.

2. The method as recited in claim 1, wherein the hydraulic decoupling of the wheel brake and the shutoff of the electric motor additionally require an existence of one or several of the following conditions:
    a detected rotation speed of a wheel braked by the wheel brake is lower than a predetermined threshold rotation-speed value;
    the ascertained target brake pressure of the active circuit is higher than a predetermined threshold pressure value;
    a variable characterizing a thermal load on the electric motor of the pressure generation device reaches a predetermined threshold load value.

3. The method as recited in claim 1, wherein the positioning assemblage has a brake master cylinder actuatable using an actuation device, and a sensor assemblage, generation of the braking request signal encompassing detection of: (i) a hydraulic pressure generated in the actuation circuit by actuation of the brake master cylinder, and/or (ii) a positioning travel of the actuation device, as variables characterizing the braking request.

4. The method as recited in claim 1, wherein, after hydraulic decoupling of the wheel brake from the pressure generation device, the displacer piston is moved using the electric motor for pressure reduction between the pressure generation device and the isolation valve.

5. The method as recited in claim 1, wherein when the condition exists that the braking request signal is constant over the predetermined time period, the pressure generation device is hydraulically coupled to the wheel brake at periodic time intervals, and the target brake pressure is established in the active circuit using the pressure generation device.

6. The method as recited in claim 5, wherein the predetermined time period is between 30 seconds and 45 seconds.

7. The method as recited in claim 1, wherein the compensation time period is equal to between 15 milliseconds and 500 milliseconds.

8. A braking system for a vehicle, comprising:
    an actuation circuit including a positioning assemblage, actuatable using an actuation device, for generating a braking request signal;
    an active circuit including a pressure generation device that has an electric motor and a displacer piston that is translationally movable using the electric motor, the active circuit further including at least one wheel brake hydraulically coupled to the pressure generation device, and an isolation valve that is disposed in a hydraulic path between the pressure generation device and the wheel brake; and
    a control apparatus that is connected to the positioning assemblage of the actuation circuit, to the pressure generation device, and to the isolation valve, the control apparatus being configured: to ascertain from the braking request signal a target brake pressure necessary in the active circuit, to apply control to the electric motor of the pressure generation device to establish an actual brake pressure in the active circuit in accordance with the target brake pressure, and, if a condition exists that the braking request signal is constant over a predetermined time period, to close the isolation valve for hydraulic decoupling of the wheel brake from the pressure generation device and to shut off the electric motor of the pressure generation device;
    wherein when the condition that the braking request signal is constant over the predetermined time period is no longer satisfied, the control unit is configured to: effect a hydraulic recoupling of the pressure generation device to the wheel brake, based on a time gradient of the braking request signal: ascertain a target brake pressure necessary in the active circuit after a predetermined compensation time period by extrapolation of the braking request signal; and establish the actual brake pressure in the active circuit using the pressure generation device in such a way that the actual brake pressure in the active circuit reaches the target brake pressure upon expiration of the compensation time period.

9. The braking system as recited in claim 8, wherein the positioning assemblage includes a brake master cylinder actuatable by the actuation device, and a sensor assemblage configured to detect: (i) a hydraulic pressure generated in the actuation circuit by actuation of the brake master cylinder, and/or (ii) a positioning travel of the actuation device, as variables characterizing a braking request, wherein the braking request signal is constituted by the variables that characterize the braking request and are detected by way of the sensor assemblage.

\* \* \* \* \*